United States Patent
Tsuida

(10) Patent No.: US 8,934,018 B2
(45) Date of Patent: Jan. 13, 2015

(54) MULTIPROJECTION DISPLAY SYSTEM AND SCREEN FORMING METHOD

(75) Inventor: Shunji Tsuida, Tokyo (JP)

(73) Assignee: NEC Corporation, Tokyo (JP)

(*) Notice: Subject to any disclaimer, the term of this patent is extended or adjusted under 35 U.S.C. 154(b) by 763 days.

(21) Appl. No.: 13/254,318

(22) PCT Filed: Mar. 9, 2010

(86) PCT No.: PCT/JP2010/053833
§ 371 (c)(1),
(2), (4) Date: Sep. 1, 2011

(87) PCT Pub. No.: WO2010/116836
PCT Pub. Date: Oct. 14, 2010

(65) Prior Publication Data
US 2012/0007986 A1 Jan. 12, 2012

(30) Foreign Application Priority Data
Mar. 30, 2009 (JP) ................................ 2009-082215

(51) Int. Cl.
H04N 7/18 (2006.01)
H04N 9/31 (2006.01)
G02B 26/10 (2006.01)
G02B 27/10 (2006.01)
(Continued)

(52) U.S. Cl.
CPC ............ H04N 9/3197 (2013.01); G02B 26/101 (2013.01); G02B 27/1066 (2013.01); H04N 9/3147 (2013.01); H04N 9/3185 (2013.01); H04N 9/3194 (2013.01)
USPC ................................ 348/159; 353/48; 353/94

(58) Field of Classification Search
CPC ............ G02B 26/101; G02B 27/1066; H04N 9/3147; H04N 9/3185; H04N 9/3194; H04N 9/3197
USPC ....................................... 348/159; 353/48, 94
See application file for complete search history.

(56) References Cited

U.S. PATENT DOCUMENTS

2006/0192853 A1* 8/2006 Lee ............................... 348/143
2008/0002160 A1* 1/2008 Chang et al. ................... 353/94

FOREIGN PATENT DOCUMENTS

| JP | 2002503892 A | 2/2002 |
|---|---|---|
| JP | 2002185987 A | 6/2002 |

(Continued)

OTHER PUBLICATIONS

International Search Report for PCT/JP2010/053833 mailed Jun. 1, 2010.

*Primary Examiner* — Anner Holder
(74) *Attorney, Agent, or Firm* — Sughrue Mion, PLLC

(57) ABSTRACT

Provided is a multiprojection display system that includes a plurality of cameras installed in positions in which the cameras can capture images of image-capturing regions including marks whose visible light reflection ratio is higher than the projection region or support members whose ratio to reflect visible light is different from the projection region. An image processing circuit detects prescribed positions and positions of vertexes of projected images from data indicating the images captured by the cameras, and outputs data indicating the detected prescribed positions and image edge data indicating the positions of the vertexes of the projected images. A control unit adjusts, when the Positions of the vertexes of the projected images shift from the prescribed positions corresponding to the vertexes, the positions and sizes of the projected images so that the positions of the vertexes of the projected images can be matched with the prescribed positions.

13 Claims, 6 Drawing Sheets

(56) References Cited

FOREIGN PATENT DOCUMENTS

| | | | |
|---|---|---|---|
| JP | 2002277958 A | 9/2002 |
| JP | 2003524915 A | 8/2003 |
| JP | 2003315914 A | 11/2003 |
| JP | 2006251604 A | 9/2006 |
| JP | 200 270461 A | 10/2006 |

* cited by examiner

MULTIPROJECTION DISPLAY SYSTEM AND SCREEN FORMING METHOD

TECHNICAL FIELD

The present invention relates to a rear-projection-type multiprojection display system that projects images onto a screen from a plurality of projectors to form one screen, and a screen forming method thereof.

BACKGROUND ART

As a large projection display, there is known a multiprojection display system that projects images onto a screen from a plurality of projectors, and connects the projected images to form one screen.

In such a multiprojection display system, positional accuracy of the images projected from the plurality of projectors on the screen greatly affects quality of the entire projected images.

For example, when the projected images shift in position, a discontinuous joint may be formed between the images projected onto the screen or edges of the adjacent images may overlap each other, thus causing great deterioration of display quality.

To deal with the problem, for example, Patent Literature 1 discusses a method of detecting coordinate positions of marks by capturing images of a plurality of marks formed around a screen or a plurality of marks projected onto the screen, and adjusting positions of projected images based on the detected positions of the marks.

However, the multiprojection display system of the background art is configured to detect a boundary in the projection region for each projector by using the marks formed on an outer circumference of the screen.

The multiprojection display system of the background art can be applied when two projectors project images onto the screen to form one screen. However, the multiprojection display system cannot be applied when three or more projectors project images onto the screen to form one screen.

For example, when four projectors project images onto the screen to form one screen, the projected images are divided into four to be displayed on the screen, and hence a mark must be formed on the screen center to indicate the boundary in the projection region for each projector.

In the multiprojection display system of the background art, there is no mention of the marks formed on the screen or a using method thereof. Thus, the boundary between the projected images on the screen cannot be accurately identified, and a discontinuous joint may be formed between the images projected onto the screen or edges of the adjacent images may overlap each other, thus causing great deterioration of display quality.

RELATED ART LITERATURES

Patent Literatures

Patent Literature 1: Japanese Patent Laid-Open No 2006-251604

SUMMARY

It is therefore an exemplary object of the present invention is to provide a multiprojection display system that can acquire projected images in which there is limited deterioration in display quality even when three or more projectors project images onto a screen to form one screen, and a screen forming method.

To achieve the object of an exemplary aspect of the present invention, a multiprojection display system in which three or more projectors project square images onto a screen, and a plurality of projected images are connected on the screen to form one screen, comprises:

a plurality of cameras identifying the prescribed positions in which vertexes of the projected images must be set on the screen, installed in positions to be able to capture images of image-capturing regions including, marks whose visible light reflection ratio is higher than the projection region of the screen and/or support members whose ratio to reflect visible light is different from the projection region and configured to support the projection region;

an image processing circuit that detects the prescribed positions and positions of the vertexes of the projected images based on captured image data acquired by capturing the images of the image-capturing regions by the cameras, and outputs data indicating the detected prescribed positions and image edge data indicating the positions of the vertexes of the projected images; and a control unit that adjusts, when the positions of the vertexes of the projected images shift from the prescribed positions corresponding to the vertexes, positions and sizes of the projected images based on the data indicating the prescribed positions and the image edge data so that the positions of the vertexes of the projected images match the prescribed positions.

To achieve the object of an exemplary aspect of the present invention, a screen forming method for a multiprojection display system in which three or more projectors project square images onto a screen, and a plurality of projected images are connected on the screen to form one screen, comprises:

capturing images of image-capturing regions including, marks whose visible light reflection ratio is higher than the projection region of the screen and/or support members whose ratio to reflect visible light is different from the projection region and configured to support the projection region by a plurality of cameras identifying prescribed positions in which vertexes of the projected images must be set on the screen;

detecting the prescribed positions and positions of the vertexes of the projected images based on captured image data acquired by capturing the images of the image-capturing regions by the cameras, and generating data indicating the detected prescribed positions and image edge data indicating the positions of the vertexes of the projected images by a control unit; and adjusting, when the positions of the vertexes of the projected images shift from the prescribed positions corresponding to the vertexes, positions and sizes of the projected images based on the data indicating the prescribed positions and the image edge data so that the positions of the vertexes of the projected images match the prescribed positions by the control unit.

BRIEF DESCRIPTION OF DRAWINGS

FIG. 1 is a schematic view showing an overall picture of a multiprojection display system according to a first exemplary embodiment of the present invention.

FIG. 2 is an enlarged plan view showing an image-capturing region located on a center of a screen shown in FIG. 1.

FIG. 3 is an enlarged plan view showing an image-capturing region located on a center edge of the screen shown in FIG. I.

FIG. 4 is a block diagram showing a configuration example of the multiprojection display system according to the first exemplary embodiment.

FIG. 5 is a flowchart showing a processing procedure of the multiprojection display system according to the present invention.

FIG. 6 is a block diagram showing a configuration example of a multiprojection display system according to a second exemplary embodiment.

FIG. 7 is a schematic view showing an example of a screen included in the multiprojection display system according to the second exemplary embodiment.

EXEMPLARY EMBODIMENT

Next, the present invention is described with reference to the drawings.

Hereinafter, a multiprojection display system according to the present invention is described by taking a configuration example of a rear-projection-type projector that includes a plurality of laser projectors for forming square images by horizontally and vertically scanning laser beams of three colors, namely, R (red), G (green), and B (blue), projected onto a screen.

The present invention can be applied to a configuration that uses a two-dimensional scanning projector for forming an image on a screen by using, for example, a LED (Light Emitting Diode) or other light sources. Therefore, the type of a light source is not limited to a laser beam. A configuration of the laser projector is described in, for example, Japanese Patent Laid-Open No. 2005-18040.

Each exemplary embodiment is described below by taking an example of a multiprojection display system that uses a two-dimensional scanning laser projector (hereinafter, simply scanning projector). However, the present invention can be applied to a multiprojection display system that uses, for example, a LCOS (Liquid Crystal On Silicon) or other microdisplays, and hence there are no restrictions on types of projectors. To adjust an image range in the multiprojection display system that uses the microdisplay, a well-known trapezoidal correction can be utilized.

An example where four scanning projectors rear-project images to form one screen on a screen is described below. However, the number of projectors used for forming a screen is not limited to four. Any number of projectors can be used as long as it is equal to or more than three.

(First Exemplary Embodiment)

Figure 1:
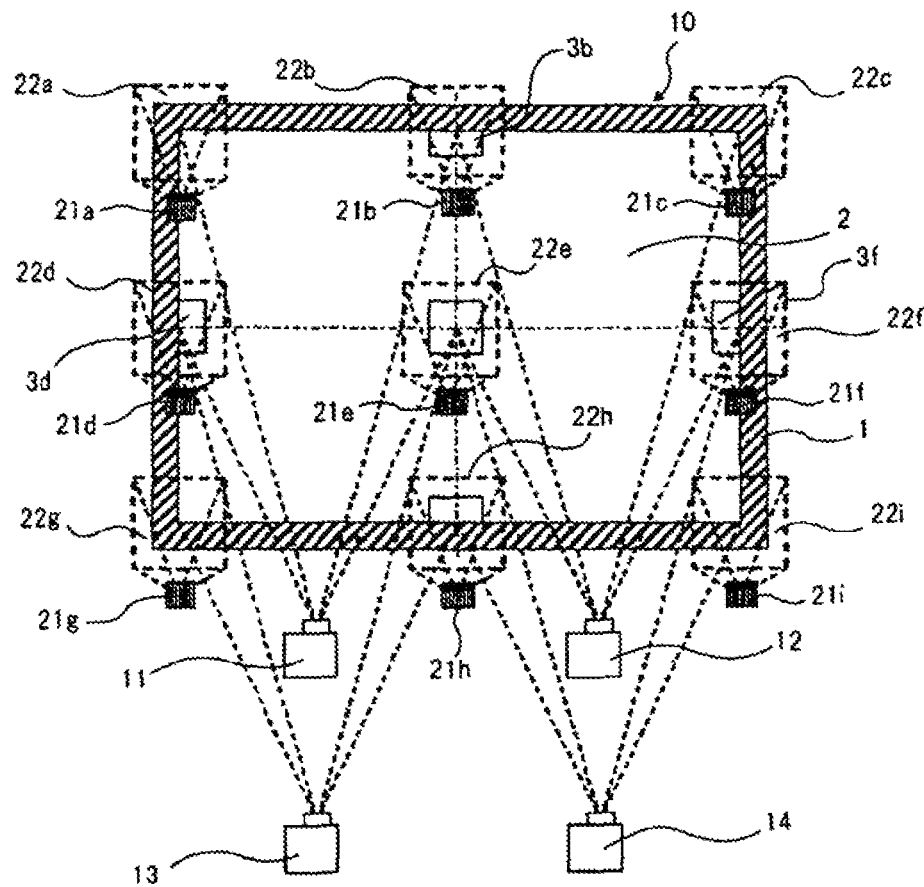
[FIG. 1]
Figure 2:
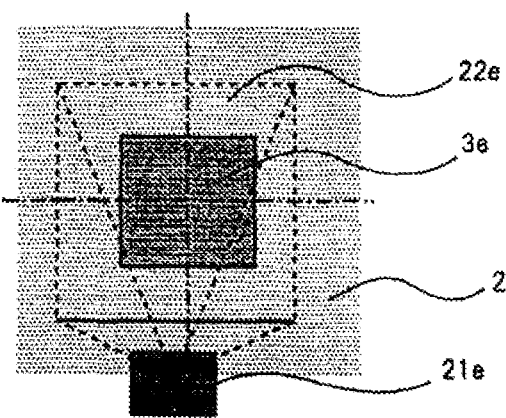
[FIG. 2]
Figure 3:
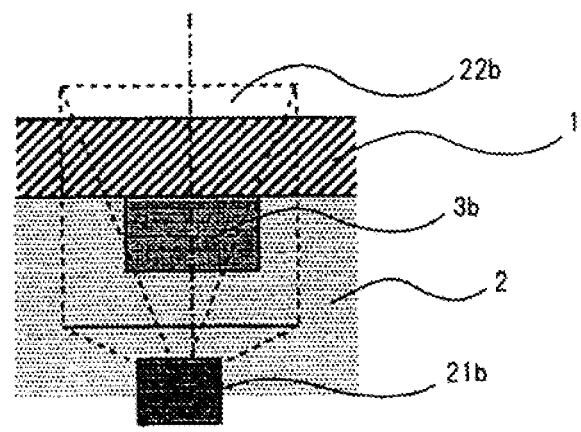
[FIG. 3]

FIG. 1 is a schematic view showing an overall picture of a multiprojection display system according to a first exemplary embodiment. FIG. 2 is an enlarged plan view showing an image-capturing region located on a center of a screen shown in FIG. 1. FIG. 3 is an enlarged plan view showing the image-capturing region located on a center edge of the screen shown in FIG. 1.

As shown in FIG. 1, the multiprojection display according to the first exemplary embodiment is configured such that, for example, four scanning projectors 11 to 14 rear-project square images on screen 10 to form one screen.

A plurality of cameras are installed on a rear surface side of screen 10 to detect positions of the images projected from scanning projectors 11 to 14. The cameras are located to be able to capture images of predetermined image-capturing regions including vertexes of the square images projected from scanning projectors 11 to 14. In FIG. 1, nine cameras 21a to 21i are arranged to capture the projected images divided into four near the vertexes, and square regions (image-capturing regions 22a to 22i) images of which can be captured by cameras 21a to 21i are surrounded with dotted lines.

Screen 10 includes projection region 2 onto which the images are projected from scanning projectors 11 to 14, and frame part 1 that surrounds an outer circumference of projection region 2. Frame part 1 is a member (support member) that supports projection region 2, and is only required to have a reflection ratio different from those of projection region 2 and marks 3b, 3d to 3f, and 3h described below. There are no restrictions on a material.

Image-capturing regions 22a to 22i of cameras 21a to 21i are classified into three types depending on positions.

FIG. 2 shows a configuration example of image-capturing region 22e located on a center of screen 10. Near a center of image-capturing region 22e, mark 3e whose visible light reflection ratio is higher than projection region 2 is formed. In image-capturing region 22e, the center of mark 3e becomes a prescribed position in which the vertexes of the images projected from scanning projectors 11 to 14 must be set.

FIG. 3 shows a configuration example of image-capturing region 22b located on the center upper edge of screen 10. Near the center of image-capturing region 22b, mark 3b whose visible light reflection ratio is higher than projection region 2 is formed. In image-capturing region 22b, mark 3b is located so that frame part 1 can cut across and the center line can be located in the boundary between frame part I and projection region 2, and hence the size of mark 3b becomes ½ of that of mark 3e. In image-capturing region 22b, the center of the boundary line between frame part 1 and mark 3b becomes a prescribed position in which the vertexes of the images projected from scanning projectors 11 and 12 must be set.

Image-capturing region 22d located on the center left edge of screen 10, image-capturing region 22f located near the center right edge of screen 10, and image-capturing region 22h located near the center lower edge of screen 10 are all similar in configuration to image-capturing region 22b shown in FIG. 3.

According to the exemplary embodiment, no mark is formed in image-capturing regions 22a, 22c, 22g, and 22i located at the corners of screen 10. In image-capturing region 22a, the corner part of the boundary line between frame part I and projection region 2 becomes a prescribed position in which the vertex of the image projected from scanning projector 11 must be set. In image-capturing region 22c, the corner part of the boundary line between frame part 1 and projection region 2 becomes a prescribed position in which the vertex of the image projected from scanning projector 12 must be set. Similarly, in image-capturing region 22g, the corner part of the boundary line between frame part 1 and projection region 2 becomes a prescribed position in which the vertex of the image projected from scanning projector 13 must be set. In image-capturing region 22i, the corner part of the boundary line between frame part 1 and projection region 2 becomes a prescribed position in which the vertex of the image projected from scanning projector 14 must be set.

Marks 3b, 3d, 3e, 3f, and 3h are formed by changing conditions of well-known low-reflection processing executed on a surface of screen 10 (projection region 2), and by setting reflection ratio of predetermined regions that become marks to visible light to values higher than that of projection region 2. Marks 3b, 3d, 3e, 3f and 3h are, as described above, used for identifying the prescribed positions in which the vertexes of the images projected from scanning projectors 11 to 14 must be set, and arranged to be included in projection region 2.

According to the exemplary embodiment, no mark is formed in image-capturing regions 22a, 22c, 22g, and 22i located at the corners of screen 10. However, there is no reason why any marks should not be formed in the regions. Marks can be formed in image-capturing regions 22a, 22c, 22g, and 22i.

Figure 4:
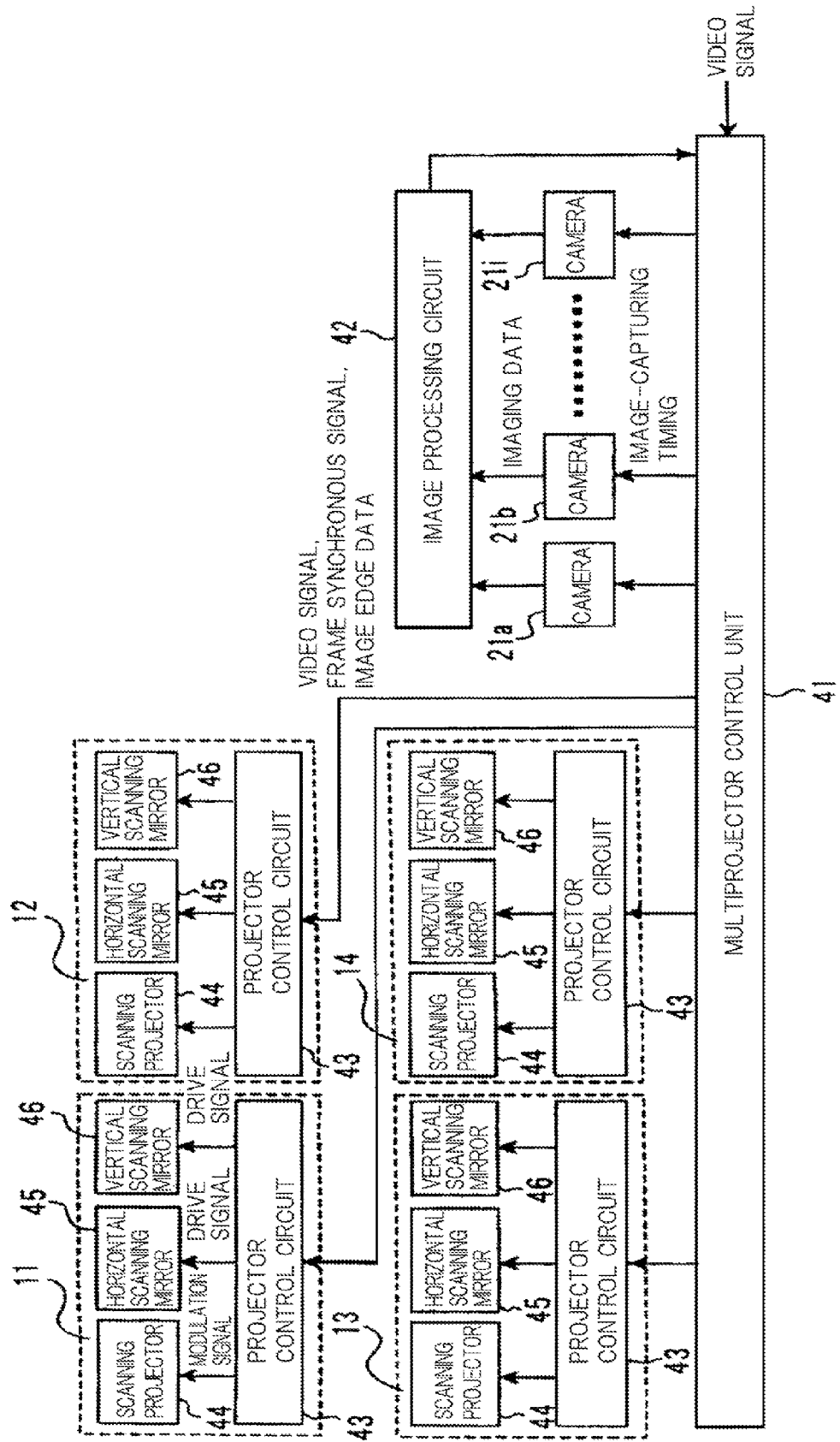
[FIG. 4]

FIG. 4 is a block diagram showing a configuration example of a multiprojection display system according to the first exemplary embodiment.

As shown in FIG. 4, the multiprojection display system according to the first exemplary embodiment includes four scanning projectors 11 to 14, multiprojector control unit 41 that controls operations of scanning projectors 11 to 14, cameras 21a to 21i that capture images of predetermined image-capturing regions 22a to 22i including the vertexes of the images projected from scanning projectors 11 to 14, and image processing circuit 42 that processes data indicating the images captured by cameras 21a to 21i.

Each of scanning projectors 11 to 14 includes a laser light source (not shown), modulator 44 that modulates the intensity of a laser beam emitted from the light source based on a video signal (including image signal) corresponding to a scanning position, horizontal scanning mirror 45 for scanning the laser beam emitted from modulator 44 in a horizontal direction, vertical scanning mirror 46 for scanning the laser beam emitted from modulator 44 in a vertical direction, and projector control circuit 43 that generates a drive signal for operating horizontal scanning mirror 45 and vertical scanning mirror 46, and a modulation signal for causing modulator 44 to change the intensity of the laser beam based on the video signal supplied from the outside. For horizontal scanning mirror 45, for example, a vibration mirror is used because a high-speed operation is necessary.

After having received the video signal from the outside to be projected onto screen 10, multiprojector control unit 41 divides the video signal into four to generate video signals corresponding to images to be displayed on scanning projectors 11 to 14. Multiprojector control unit 41 supplies the video signals corresponding to display positions to scanning projectors 11 to 41, and transmits a frame synchronous signal indicating scanning timing.

Multiprojector control unit 41 can be configured to receive four video signals corresponding to scanning projectors 11 to 14. In this case, multiprojector control unit 41 is not required to generate a video signal for each of scanning projectors 11 to 14.

Multiprojector control unit 41 according to the exemplary embodiment transmits an image-capturing timing signal to instruct image-capturing timing to each of cameras 21a to 21i.

Each projector control circuit 43 supplies the drive signal to horizontal scanning mirror 45 and vertical scanning mirror 46 based on the frame synchronous signal received from multiprojector control unit 41, and supplies a modulation signal generated based on the video signal received from multiprojector control unit 41 to modulator 44.

Image processing circuit 42 identifies frame part 1, projection region 2, and marks 3b, 3d, 3e, 3f, and 3h based on data indicating the images captured by cameras 21a to 21i, and detects prescribed positions of the vertexes of the images to be projected from scanning projectors 11 to 14 onto screen 10. Frame part 1, projection region 2, and marks 3b, 3d, 3e, 3f, and 3h are different from one another in reflection ratio as described above. Hence, these portions can be identified by, for example, performing solid white displaying at the time of activating the system, and capturing the images of image-capturing regions 22a to 22i by Cameras 21a to 21i. After frame part I, projection region 2, and marks 3b, 3d, 3e, 3f, and 3h have been identified, the center of mark 3e, the centers of the boundary lines between frame part 1 and marks 3b, 3d, 3e, 3f, and 3h, and the corners of the boundary line between frame part 1 and projection region 2 can be determined as prescribed positions of the vertexes of the projected images.

Image processing circuit 42 detects the vertexes of the images actually projected from scanning projectors 11 to 14, and outputs image edge data indicating positions of the vertexes of the images to multiprojector control unit 41. The vertexes of the projected images can be detected by performing, for example, well-known Laplacian filter processing for data indicating the images captured by cameras 21a to 21i. When the vertexes of the projected images are detected, during an image-capturing period of cameras 21a to 21i, scanning directions and scanning timings should preferably be set different among scanning projectors 11 to 14 to prevent simultaneous capturing of both images adjacent to each other in the vertical direction and the horizontal direction.

Multiprojector control unit 41 supplies the data indicating the prescribed positions of the vertexes of the projected images and the image edge data received from image processing circuit 42 to projector control circuit 43 of the corresponding scanning projector.

Projector control circuit 43 of each of scanning projectors 11 to 14 determines whether the vertex of the projected image has shifted from the corresponding prescribed position based on the image edge data, and determines whether the scanning ranges of horizontal scanning mirror 45 and vertical scanning mirror 46 must be adjusted. When adjustment is necessary, the position and size of the projected image are adjusted so that the position of the vertex of the projected image can match the corresponding prescribed position. The position and the size of the projected image can be adjusted based on the drive signal supplied to the scanning mirror to be adjusted.

The horizontal scanning range of the projected image can be controlled based on the voltage (amplitude value) of the drive signal supplied to horizontal scanning mirror 45, and the vertical scanning range of the projected image can be controlled based on a voltage (amplitude value) of the drive signal supplied to vertical scanning mirror 46.

For example, the horizontal scanning range is widened when the amplitude value of the drive signal supplied to horizontal scanning mirror 45 is set large, and narrowed when the amplitude value is set small. Vertical scanning mirror 46 can similarly be controlled. Determination as to the necessity of adjustment of the scanning range, and adjustment of the drive signal of the scanning mirror can be executed by multiprojector control unit 41. In the scope of claims of the present invention, a configuration for determining the necessity of adjustment of the scanning range and executing adjustment of the drive signal of the scanning mirror is referred to as a "control unit".

Multiprojector control unit 41 and image processing circuit 42 included in the multiprojection display system according to the first exemplary embodiment, and projector control circuit 43 included in each of scanning projectors 11 to 14 can be achieved by, for example, various arithmetic and logic circuits including a CPU (Central Processing Unit) for executing processing based on a program, a DSP (Digital Signal Processor) for executing a predetermined arithmetic operation, and an A/D (Audio/Digital) converter, a D/A (Digital/Audio) converter, and a memory.

Figure 5:
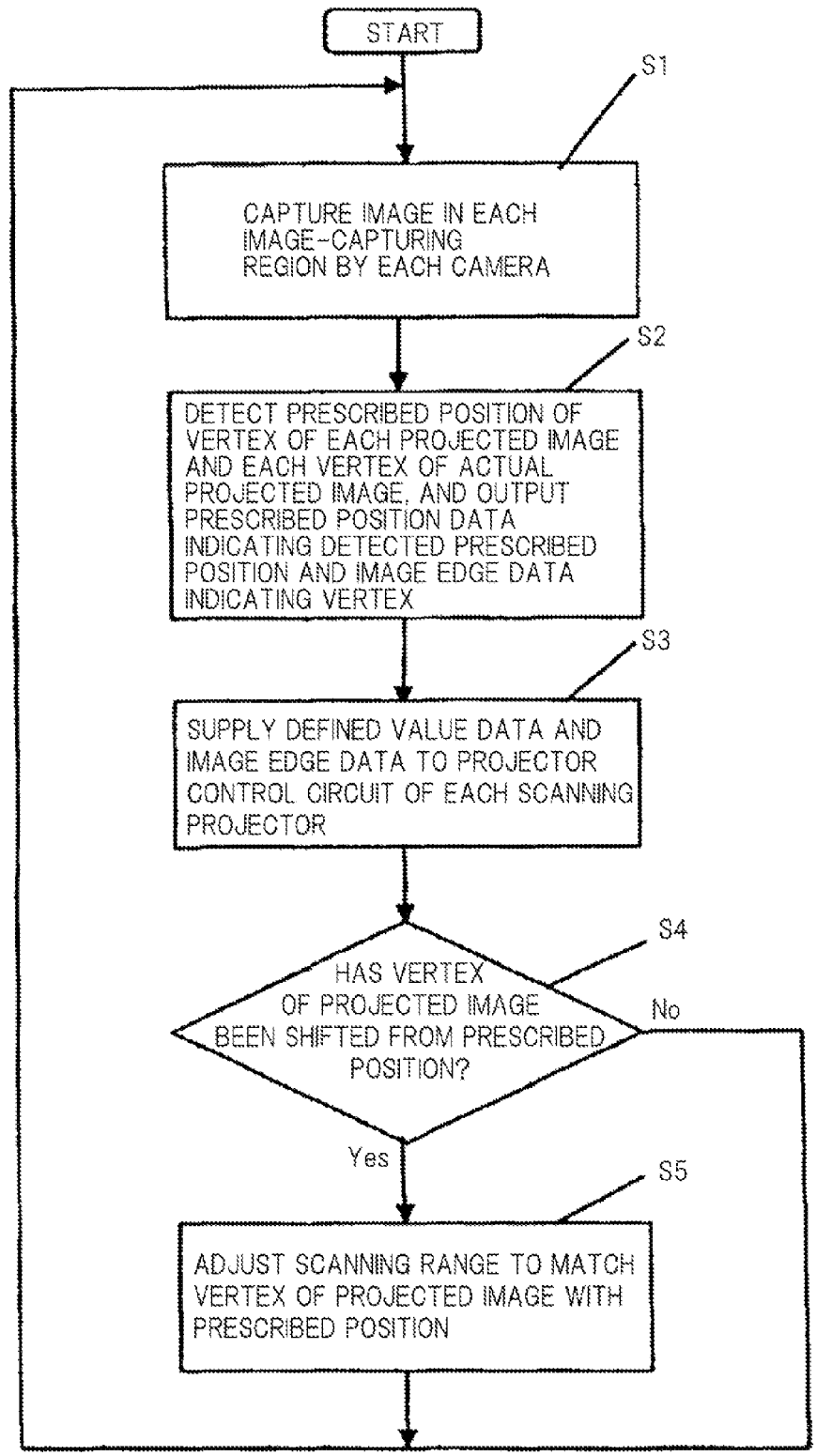
[FIG. 5]

FIG. 5 is a flowchart showing a processing procedure of the multiprojection display system according to the present invention.

In the multiprojection display system according to the first exemplary embodiment, when the system is activated, each of scanning projectors 11 to 14 performs solid white displaying as described above. Cameras 21a to 21i capture images during an image-capturing period including a period of scanning in image-capturing regions 22a to 22i in a display period of one frame of the images by scanning projectors 11 to 14, and transfer data indicating the captured images to image processing circuit 42 (step S1).

After having acquired the data indicating the captured images from cameras 21a to 21i, image processing circuit 42 detects prescribed positions of vertexes of the images projected from scanning projectors 11 to 14, detects the vertexes of the images actually projected from scanning projectors 11 to 14, and outputs data indicating the detected prescribed positions of the vertexes (hereinafter, prescribed position data) and image edge data indicating positions of the actual vertexes of the projected images to multiprojector control unit 41 (step S2).

Multiprojector control unit 41 supplies the prescribed position data of the projected images and the image edge data received from image processing circuit 42 to projector control circuit 43 of the corresponding scanning projector (step S3).

Projector control circuit 43 of each of scanning projectors 11 to 14 determines, based on the prescribed position data of each of the vertexes of the images and the image edge data received from multiprojector control unit 41, whether the vertex of the projected image has shifted from the corresponding prescribed position (step S4). When the vertex of the projected image has shifted, the scanning range of each of scanning projectors 11 to 14 is adjusted to match the vertex with the prescribed position (step S5). On the other hand, when the vertex of the projected image has not shifted from the preset prescribed position, the processing returns to step S1 to repeat steps S1 to S5.

After having adjusted the scanning range of each of the projected image, projector control circuit 43 causes, based on a video signal supplied from the outside, modulator 44 to modulate the intensity of a laser beam and project a video. In this case, in view of the difference in reflection ratio from projection region 2, the scanning speed of projected light (laser beam) in each of marks 3b, 3d, 3de, 3f, and 3h whose visible light reflection ratio (lower in transmittance) is higher than projection region 2 is set lower than that of projected light in projection region 2.

For example, the image can be displayed even in a region of low transmittance without reducing luminance by controlling the scanning speed to satisfy the following relational expression (1):

$$T1/v1 \leq T2/v2 \quad (1)$$

T1: transmittance in region (projection region 2) having high transmittance

T2: transmittance in regions (marks 3b, 3d, 3e, 3f, and 3h) having low transmittance v1: maximum value of scanning speed of projected light of region having high transmittance v2: maximum value of scanning speed of projected light of region having low transmittance When the vibration mirror is used for horizontal scanning mirror 45, the scanning speed of light projected from each of scanning projectors 11 to 14 onto screen 10 becomes high near the center in a projection range of each of scanning projectors 11 to 14, and low near the edge in the projection range. Thus, the relational expression (1) can nearly be satisfied without any special processing.

In the multiprojection display system according to the exemplary embodiment, the prescribed positions corresponding to the vertexes of the projected images can be identified when the system is activated, and the vertexes of the projected images can be detected during image displaying. This enables adjustment of the scanning ranges of the images projected from scanning projectors 11 to 14 as needed.

According to the multiprojection display system of the exemplary embodiment, the prescribed position of the vertex of the image projected from each projector can be accurately recognized. Adjusting the position and the size of each projected image so that each vertex can match the corresponding prescribed position enables acquisition of a projected image in which there is limited deterioration in the display quality even when three or more projectors project images onto screen 10 to form one screen.

According to the exemplary embodiment, frame part 1, projection region 2, and marks 3b, 3d to 3f, and 3h are identified based on the data indicating the images captured by cameras 21a to 21i, and the prescribed positions of the vertexes of the images projected from scanning projectors 11 to 14 onto screen 10 are detected. This requires cameras 21a to 21i only to be able to capture images in a range in which projection region 2, frame part 1, and marks 3b, 3d to 3f, and 3h can be identified, and the image-capturing center is permitted to shift from a corresponding prescribed position. As a result, adjustment of installing positions of cameras 21a to 21i is unnecessary during assembling of the multiprojection display system, thus suppressing an increase in number of assembling steps.

(Second Exemplary Embodiment)

In an image projected from a scanning projector onto a screen, distortion (barrel distortion) in which the center of an image edge swells from the image center or distortion (bobbin distortion) in which the center of the image edge contracts toward the image center may occur. In such a case, even when the vertex of each projected image matches a corresponding prescribed position, positional shifting occurs near the center of the image edge.

The second exemplary embodiment is directed to a method of adjusting the position of the vertex of each projected image while correcting barrel distortion or bobbin distortion generated in the projected image.

Figure 6:
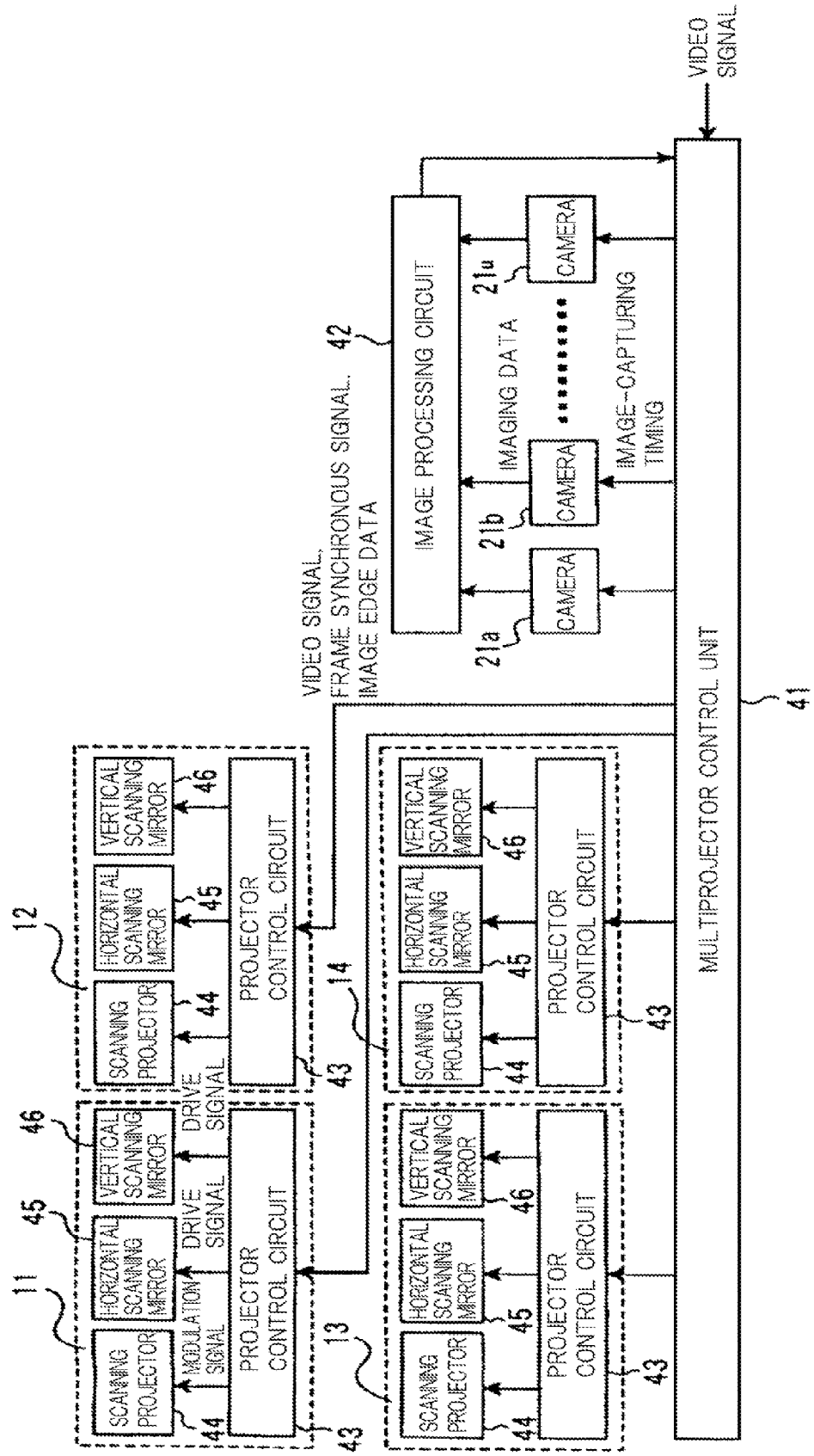
[FIG. 6]
Figure 7:
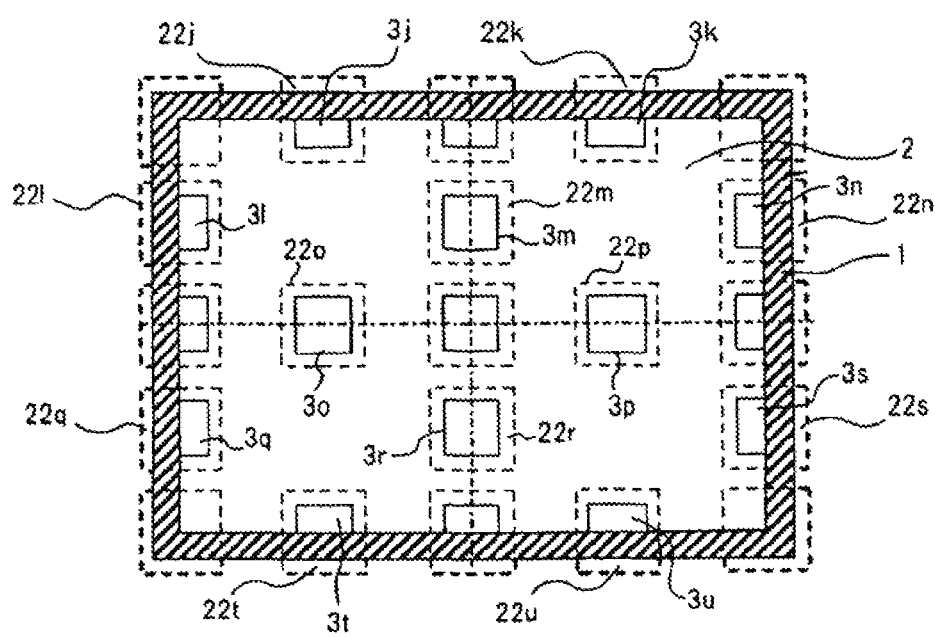
[FIG. 7]

FIG. 6 is a block diagram showing a configuration example of a multiprojection display system according to a second exemplary embodiment. FIG. 7 is a schematic view showing an example of a screen included in the multiprojection display system according to the second exemplary embodiment.

The multiprojection display system according to the second exemplary embodiment is, as in the case of the multiprojection display according to the first exemplary embodiment, configured such that, for example, four scanning projectors 11 to 14 rear-project images on screen 10 to form one screen.

As shown in FIG. 6, as in the case of the multiprojection display according to the first exemplary embodiment, the multiprojection display system according to the second exemplary embodiment includes, on a rear surface side of screen 10, cameras 21a to 21i to capture images of image-capturing regions 22a to 22i including vertexes of the images projected from scanning projectors 11 to 14, and cameras 21j to 21u to capture images of image-capturing regions 22j to 22u including edge centers of the images. Other components are similar to those of the multiprojection display system according to the first exemplary embodiment shown in FIG. 2, and thus description thereof is omitted.

FIG. 7 shows only screen 10 and image-capturing regions 22a to 22u located on screen 10, while showing none of scanning projectors 11 to 14 and cameras 21a to 21u.

Image processing circuit 42 according to the exemplary embodiment outputs vertex data indicating vertexes of projected images to multiprojector control unit 41 based on captured image data near the vertexes of the images captured by cameras 21a to 21i, and image edge data indicating edges of the projected images to multiprojector control unit 41 based on captured image data near centers of the images captured by cameras 21j to 21u. Multiprojector control unit 41 supplies the image edge data received from image processing circuit 42 to projector control circuits 43 of corresponding scanner projectors 11 to 14.

Projector control circuit 43 detects distortion of the projected images based on the received image edge data, and performs distortion correction to correct the distortion for a video signal. The distortion is corrected so that the projected images can become nearly rectangular, in other words, edges of the projected images can become horizontal or vertical. More specifically, with a straight line connecting vertex positions set as a reference, the distortion is corrected by gradually reducing the amplitude of a scanning mirror toward the center of an end when the end swells outside, and by gradually enlarging the amplitude of the scanning mirror toward the center of the end when the end contracts inside. For the distortion correction, well-known correction methods can be used depending on types of distortion. The exemplary embodiment is in no way limitative of the correction method.

Projector control circuit 43 generates a modulation signal based on the video signal after the distortion correction, and supplies the modulation signal to modulator 44. When the vertexes of the projected images after the distortion correction have shifted from corresponding prescribed positions, the vertexes of the projected images are matched with the corresponding prescribed positions by adjusting a drive signal supplied to horizontal scanning mirror 45 and vertical scanning mirror 46. Other components and processing are similar to those of the first exemplary embodiment, and thus description thereof is omitted.

According to the multiprojection display according to the second exemplary embodiment, in addition to effects similar to those of the first exemplary embodiment, distortions of the images projected onto screen 10 can be corrected.

The exemplary embodiments of the present invention have been described. However, the exemplary embodiments are in no way limitative of the invention. Various changes and modifications understandable to those skilled in the art can be made of the configuration and the specifics of the present invention.

This application claims priority from Japanese Patent Application No. 2009-082215 filed Mar. 30, 2009, which is hereby incorporated by reference herein in its entirety.

The invention claimed is:

1. A multiprojection display system in which a plurality of projectors project images onto a screen, and a plurality of projected images are connected on the screen to form one screen, comprising:
    a plurality of cameras, installed in positions to be able to capture images of image-capturing regions including, marks whose visible light reflection ratio is higher than the projection region of said screen and/or support members whose ratio to reflect visible light is different from the projection region and configured to support said projection region;
    an image processing circuit that detects the prescribed positions in which vertexes of the projected images must be set on said screen and positions of the vertexes of said projected images based on captured image data acquired by capturing the images of said image-capturing regions by said cameras, and outputs data indicating the detected prescribed positions and image edge data indicating the positions of the vertexes of said projected images; and
    a control unit that adjusts, when the positions of the vertexes of said projected images shift from the prescribed positions corresponding to the vertexes, positions and sizes of said projected images based on the data indicating said prescribed positions and said image edge data so that the positions of the vertexes of said projected images match said prescribed positions.

2. The multiprojection display system according to claim 1, wherein said projectors are two-dimensional scanning projectors.

3. The multiprojection display system according to claim 1, wherein said control unit sets the scanning speeds of projected light lower on the marks than the scanning speeds of projected light in said projection region.

4. The multiprojection display system according to claim 3, wherein said control unit controls the scanning speed of projected light to satisfy the following relational expression:

$$T1/v1 \leq T2/v2$$

T1: transmittance in said projection region
T2: transmittance on said marks
v1: maximum value of the scanning speed of projected light in said projection region
v2: maximum value of the scanning speed of projected light on said marks.

5. The multiprojection display system according to claims 1, further comprising a plurality of cameras, identifying the prescribed positions in which edge centers of the projected images must be set on said screen, installed in positions to be able to capture images of image-capturing regions including, marks whose visible light reflection ratio is higher than the projection region of said screen and/or support members whose ratio to reflect visible light is different from the projection region and configured to support said projection region;
    wherein said control unit detects distortion of said projected images based on captured image data acquired by capturing the images of the image-capturing regions including the edge centers of the projected images by said cameras, and corrects the detected distortion.

6. The multiprojection display system according to claims 1, wherein said marks are formed by performing low-reflection processing on a surface of said screen to set a reflection ratio to a desired value.

7. A screen forming method for a multiprojection display system in which a plurality of projectors project images onto a screen, and a plurality of projected images are connected on the screen to form one screen, comprising:
    capturing images of image-capturing regions including, marks whose visible light reflection ratio is higher than the projection region of said screen and/or support members whose ratio to reflect visible light is different from the projection region and configured to support said projection region by a plurality of cameras identifying prescribed positions in which vertexes of the projected images must be set on the screen;

detecting said prescribed positions and positions of the vertexes of said projected images based on captured image data acquired by capturing the images of said image-capturing regions by said cameras, and generating data indicating the detected prescribed positions and image edge data indicating the positions of the vertexes of said projected images by a control unit; and adjusting, when the positions of the vertexes of said projected images shift from the prescribed positions corresponding to the vertexes, positions and sizes of said projected images based on the data indicating the prescribed positions and the image edge data so that the positions of the vertexes of the projected images match said prescribed positions by said control unit.

8. The screen forming method according to claim 7, wherein said projectors are two-dimensional scanning projectors.

9. The screen forming method according to claim 7, wherein said control unit sets the scanning speeds of projected light lower on said marks than the scanning speeds of projected light in said projection region.

10. The screen forming method according to claim 8, wherein said control unit controls the scanning speed of projected light to satisfy the following relational expression:

$$T1/v1 \leq T2/v2$$

T1: transmittance in said projection region
T2: transmittance on said marks
v1: maximum value of the scanning speed of projected light in said projection region
v2: maximum value of the scanning speed of projected light on said marks.

11. The screen forming method to claim 7, further comprising capturing images of image-capturing regions including, marks whose visible light reflection ratio is higher than the projection region of said screen and/or support members whose ratio to reflect visible light is different from the projection region and configured to support said projection region by a plurality of cameras identifying prescribed positions in which edge centers of the projected images must be set on said screen; and detecting distortion of the projected images based on captured image data acquired by capturing the images of the image-capturing regions including the edge centers of the projected images by said cameras, and correcting the detected distortion by said control unit.

12. The screen forming method according to claim 7, wherein said marks are formed by performing low-reflection processing on a surface of said screen to set a reflection ratio to a desired value.

13. A screen for a multiprojection display system in which a plurality of projectors project images, and a plurality of projected images are connected on the screen to form one screen, comprising:

the projection region; marks whose visible light reflection ratio is higher than said projection region; and peripheries whose ratio to reflect visible light is different from the projection region and supported said projection region.

* * * * *